United States Patent Office 2,868,827
Patented Jan. 13, 1959

2,868,827

PROCESS FOR PRODUCING TRIORGANO-PHOSPHATES

Michael J. O'Connor, Euclid, Ohio, and William K. Detweiler, Westfield, N. J., assignors to Union Carbide Corporation, a corporation of New York No Drawing. Application September 6, 1956
Serial No. 608,192

6 Claims. (Cl. 260—461)

This invention relates to a process for producing triorgano-phosphates and in particular to a process for producing trialkyl and triaryl phosphates.

Triorgano-phosphates are useful materials in a variety of applications. By way of illustration, triorganophosphates may be used as lubricants, as hydraulic fluids and as plasticizers for vinyl chloride resins.

Triorgano-phosphates have been prepared according to known processes by reactions that may be represented by the following equation, $$3ROH + POCl_3 \rightarrow (RO)_3PO + 3HCl \quad (1)$$

wherein R is an alkyl group or an aryl group.

It is known that the reaction represented by Equation 1 may be favorably influenced so as to produce greater yields of the triorgano-phosphate if a tertiary amine, such as pyridine, is added to the reaction mixture. These tertiary amines combine with the hydrogen chloride produced in the reaction to form a salt and so, according to the known law of mass action as formulated by Guldberg and Waage, a greater yield of the triorgano-phosphate is produced due to the removal of one of the reaction products. In commercial operations it was found that the use of tertiary amines in the manner described is not economically practical both due to the cost of the amines and also due to the cost involved in recovering the amine from the salt so that the amine may be reused in the process.

Another known expedient for increasing the yield of the triorgano-phosphates produced in accordance with Equation 1 comprises adding a metal such as copper powder, iron filings, calcium, aluminum, magnesium and the like; or a halide such as aluminum chloride, magnesium chloride, ferric chloride, tin tetrachloride, zinc chloride, boron trifluoride and the like; or a sulfate such as copper sulfate and the like; or an oxide such as magnesium oxide, copper oxide and the like, to the reaction mixture. These metals, halides, oxides and sulfates serve to catalyze the desired reaction.

This known method employing catalysts for producing triorgano-phosphates has several drawbacks among which are the fairly low yields of the triorgano-phosphates produced in spite of the presence of the catalyst, the production of toxic tetraalkyl pyrophosphate by-products, the corrosion of the reactors due to the presence of the catalyst, low conversion of the starting materials and, when aluminum chloride is used as a catalyst, the formation of stable complexes or gelatinous precipitates as described in United States Patents 2,610,978 and 2,632,018.

The following reactions illustrate the formation of undesirable by-products when the reaction represented by Equation 1 is conducted either without a catalyst or in the presence of any of the above-mentioned catalysts other than magnesium chloride.

$$3ROH + POCl_3 \rightarrow ROPOCl_2 + HCl + 2ROH \quad (2)$$
$$3ROH + POCl_3 \rightarrow (RO)_2POCl + 2HCl + ROH \quad (3)$$
$$ROH + HCl \rightarrow RCl + H_2O \quad (4)$$
$$H_2O + (RO)_2POCl \rightarrow (RO)_2POH + HCl \quad (5)$$

$$(RO)_2POH + (RO)_2POCl \rightarrow (RO)_2P\underset{O}{\overset{\|}{-}}O\underset{O}{\overset{\|}{-}}P(OR)_2 + HCl \quad (6)$$

Besides lowering the yield of the desired product and lowering the efficiency of the reaction, these by-products often present difficult refining problems. In the case of the lower alkyl derivatives, the chlorinated derivatives may be hydrolyzed in the presence of an aqueous base to be corresponding phosphoric acids. These acids can be neutralized with an alkali metal hydroxide and washed from the trialkyl phosphate. However, this washing procedure often fails for the higher molecular weight derivatives.

By another known method, which is described in United States Patent 2,410,118, the by-products produced by reactions such as are illustrated by Equations 2 through 6 are separated by adding an alkali metal hydroxide to the reaction mixture at the completion of the reaction. The desired product is then distilled from the reaction mixture. This method, while successful, makes distillation difficult because of the large amount of salts of the various phosphoric acids which concentrate in the distillation kettle.

When alcohols are reacted with phosphorus oxychloride, the impurities that are formed by reactions that are illustrated by Equation 6 may be removed by reacting the impurities with the sodium salt of the alcohol. The impurities and the salt react according to the equation:

$$(RO)_2P\underset{O}{\overset{\|}{-}}O\underset{O}{\overset{\|}{-}}P(OR)_2 + RONa \rightarrow (RO)_3PO + (RO)_2PONa \underset{O}{\overset{\|}{}} \quad (7)$$

This procedure reclaims a part of the by-products but the sodium salt produced makes distillation of the desired product from the reaction mixture difficult.

We have found that triorgano-phosphates may be produced by a process that comprises forming a mixture of a primary alcohol or a phenol, phosphorus oxychloride and a catalytic amount of titanium tetrachloride and heating the mixture to a temperature sufficiently elevated to cause the alcohol or the phenol and the phosphorus oxychloride to react to produce the triorgano-phosphate.

In the operation of our process as compared to the operation of known processes we have found that higher yields of the desired triorgano-phosphates are produced, greater conversions of the starting materials are achieved, less by-products are formed (especially less tetraalkyl pyrophosphates) and less corrosion of the reactors occurs. In addition, no stable complexes or gelatinous precipitates are formed in our process.

The compounds that are reacted with phosphorus oxychloride in our process (i. e. primary alcohols and phenols) are organic hydroxyl compounds. The phenols that are useful as reactants in our process may contain from 0 to 3 alkyl substituents. The alkyl substituents that may be present in the phenol reactants of our process may contain from 1 to 4 carbon atoms and these alkyl substituents may contain primary, secondary and tertiary carbon atoms. Illustrative of these phenols are phenol, o-cresol, m-cresol, p-cresol, the isomeric xylenols, o-n-butyl phenol, m-n-butyl phenol, p-n-butyl phenol, the isomeric tertiary butyl phenols, o-cumenol, m-cumenol and p-cumenol. The other organic hydroxyl compounds that are reacted with phosphorus oxychloride in our process are primary alcohols that contain from 4 to 13 carbon atoms. These primary alcohols may have a straight chain or a branched chain carbon arrangement and they may be represented by the formula $R'CH_2OH$ wherein $R'$ is an alkyl group that contains from 3 to 12 carbon atoms. Illustrative of these primary alcohols are the alcohols produced by the "oxo" process, n-butanol, n-hexanol, 2-ethylbutanol, 2-ethylhexanol, 2-methylpentanol, 3-methylpentanol and 2-propylheptanol.

The reaction of an organic hydroxyl compound and phosphorus oxychloride in the presence of a catalytic amount of titanium tetrachloride to produce triorgano-phosphates according to our process may be represented by the equation:

$$3R''OH + POCl_3 \rightarrow (R''O)_3PO + 3HCl \qquad (8)$$

wherein $R''O$ is a phenoxy group that may contain from 0 to 3 alkyl substituents, which alkyl substituents may contain from 1 to 4 carbon atoms or a $R'CH_2O$ group wherein $R'$ is an alkyl group that contains from 3 to 12 carbon atoms. Illustrative of the triorgano-phosphates that may be produced by our process (i. e. compounds that may be represented by the formula $(RO'')_3PO$) are the isomeric tributyl phosphates, tri(2-ethylhexyl) phosphate, the isomeric trixylyl phosphates, triphenyl phosphate and the isomeric tricresyl phosphates.

The amount of titanium tetrachloride used as a catalyst in our process is not narrowly critical. Thus amounts of titanium tetrachloride of from about 0.01 part by weight to about 5 parts by weight per 100 parts by weight of the reaction mixture (i. e. the organic hydroxyl compound, phosphorus oxychloride and titanium tetrachloride) may be used but amounts of titanium tetrachloride of from about 0.1 part by weight to about 1.0 part by weight per 100 parts by weight of the reaction mixture are preferred. Greater amounts of titanium tetrachloride in the reaction mixture may be used but no commensurate advantage is gained thereby.

The reaction conditions chosen for use in our process are somewhat dependent upon whether a primary alcohol or a phenol is used as a reactant. By way of illustration, when a primary alcohol containing eight carbon atoms (e. g. 2-ethylhexanol) is used as a reactant in our process the following conditions may be used:

TABLE I

|  | Operative | Preferred |
|---|---|---|
| First Step—Addition of 2 moles [1] of alcohol to POCl₃: | | |
| Temperature, °C | −10 to 30 | 20 |
| Time, hours | 1 to 4 | 3 |
| Pressure, mm. Hg | 300 to 760 | 400 |
| Second Step—Addition of 2.7 moles [1] of alcohol to POCl₃: | | |
| Temperature, °C | 20 to 100 | 35 |
| Time, hours | 0.5 to 2.0 | 1 |
| Pressure, mm. Hg | 20 to 100 | 30 |
| Third Step—Reaction: | | |
| Temperature, °C | 60 to 150 | 100 |
| Time, hours | 6 to 18 | 12 |
| Pressure, mm. Hg | (²) | 30 |
| Total alcohol to POCl₃ ratio on a mole basis | 3:1 to 6:1 | 4.7:1 |

[1] When total alcohol to POCl₃ ratio as a mole basis is 4.7:1.
[2] Adjusted so that alcohol will reflux at the desired temperature.

fied phenols and 1.3% by weight of non-phenolic impurities is used as a reactant in our process the following conditions may be used:

TABLE II

|  | Operative | Preferred |
|---|---|---|
| Mixing of Raw Materials, Temperature, °C | −10 to 50 | 20 |
| Charging to kettle: | | |
| Temperature, °C | 90 to 150 | 100 |
| Time, hours | 1 to 4 | 2 |
| Pressure, mm. Hg | 400 to 760 | 760 |
| Reaction Period: | | |
| Temperature, °C | 130 to 180 | 160 |
| Time, hours | 10 to 20 | 15 |
| Pressure, mm. Hg | 10 to 100 | 50 |
| Total alkyl-substituted phenol to POCl₃ ratio on a mole basis | 3:1 to 6:1 | 3.1:1 |

As is known in the art, the reaction conditions tabulated above in Tables I and II may be suitably modified when organic hydroxyl compounds other than a primary alcohol containing eight carbon atoms or the above-described mixture of alkyl-substituted phenols are reacted with phosphorus oxychloride to produce triorgano-phosphates according to our process.

The following data, tabulated from the examples, illustrate some of the advantages of our process when used in the preparation of tri(2-ethylhexyl) phosphate from 2-ethylhexanol and phosphorus oxychloride.

TABLE III

| Example Number | I | II | III | IV | V |
|---|---|---|---|---|---|
| Catalyst type | None | AlCl₃ | MgCl₂ | ZnCl₂ | TiCl₄ |
| Catalyst conc., percent by wt | 0 | 0.14 | 0.10 | 0.14 | 0.19 |
| Reaction time, hours | 10.5 | 11 | 11 | 13.25 | 10 |
| Mol ratio, ROH/POCl₃ | 4.7 | 4.7 | 4.7 | 4.7 | 4.7 |
| Yield based on phosphorus oxychloride, percent: | | | | | |
| tri (2-ethylhexyl) phosphate | 75.2 | 87.6 | 88.7 | 76.7 | 94.8 |
| tetra (2-ethylhexyl) pyrophosphate | 13.7 | 9.2 | nil | 6.5 | 0.9 |
| di (2-ethylhexyl) chlorophosphate | 7.5 | 0.6 | 0.2 | 2.8 | 0.6 |
| di (2-ethylhexyl) phosphoric acid | 1.3 | 1.7 | 11.4 | 6.4 | [1] 6.9 |

[1] Total over 100 percent attributable to slight analytical error.

Titanium tetrachloride has been found to cause less corrosion of steel reactors than magnesium chloride.

The following data, tabulated from the examples, illustrate some of the advantages of our process when used in the preparation of triaryl phosphates from a mixture of alkyl-substituted phenols and phosphorus oxychloride.

TABLE IV

| Example Number | VI | VII | VIII | IX | X | XI |
|---|---|---|---|---|---|---|
| Catalyst | None | ZnCl₂ | FeCl₃ | MgCl₂ | AlCl₃ | TiCl₄ |
| Catalyst conc., percent by wt | nil | 0.14 | 0.17 | 0.10 | 0.14 | 0.20 |
| Yield based on POCl₃ charged, percent: | | | | | | |
| aryl dichlorophosphates | 5.8 | 79.9 | 43.1 | 0.6 | 0.4 | 1.5 |
| diaryl chlorophosphates | 94.2 | 17.2 | 49.5 | 98.3 | 98.1 | 96.6 |
| triaryl phosphates |  |  |  |  |  |  |

As a further illustration, when a mixture of alkyl-substituted phenols containing 1.9% by weight of m-cresol, 0.8% by weight p-cresol, 0.5% by weight o-ethylphenol, 22.5% by weight m-ethylphenol, 12.8% by weight p-ethylphenol, 4.5% by weight 2,3-xylenol, 7.0% by weight 2,4-xylenol, 4.8% by weight 2,5-xylenol, 5.5% by weight 3,5-xylenol, 3.0% by weight 3,4-xylenol, 16.3% by weight o-propylphenol, 19.1% by weight of unidenti- The mixture of alkyl-substituted phenols used in the following examples contained the following compounds: 1.9% by weight of m-cresol, 0.8% by weight p-cresol, 0.5% by weight o-ethylphenol, 22.5% by weight m-ethylphenol, 12.8% by weight p-ethylphenol, 4.5% by weight 2,3-xylenol, 7.0% by weight 2,4-xylenol, 4.8% by weight 2,5-xylenol, 5.5% by weight 3,4-xylenol, 16.3% by weight 3,5-xylenol, 3.0% by weight o-propylphenol, 19.1% by weight of unidentified phenols and 1.3% by weight of non-phenolic impurities.

The following examples illustrate the invention.

Example I

At a pressure of 400 mm. Hg and a temperature of 20° C., 1042 grams (8 moles) of 2-ethylhexanol were added, over a 3-hour period, to 613.5 grams (4 moles) of phosphorus oxychloride in a 5-liter glass jacketed kettle equipped with a thermometer well, stirrer, dropping funnel, reflux condenser and a suitable vacuum system which was protected with a cold trap. After the first addition had been completed, the pressure was reduced to 30 mm. Hg, the temperature raised to 35° C. and 1,406 grams (10.8 moles) of 2-ethylhexanol added over a period of 45 minutes.

The reaction temperature was slowly raised to maintain the reaction rate until no further reduction in acidity was obtained. This required 10.5 hours and a temperature of 105° C. After cooling to room temperature, 2,279 grams of crude product were obtained which had the following properties:

| | |
|---|---|
| Specific gravity, 23°/20° C. | 0.8900 |
| Color, Pt-Co (APHA) [1] | 10 |
| Refractive index, $N_D^{25}$ | 1.4754 |
| Acidity, meq. per gram | 0.266 |

[1] As described in "Standard Methods for the Examination of Water and Sewage," 9th edition (1946), pp. 14–15, published jointly by The American Public Health Association and The American Water Wastes Association.

This composition of this crude product was found by analysis to be:

| | Percent by wt. |
|---|---|
| Hydrogen chloride | 0.07 |
| Di(2-ethylhexyl) chlorophosphate | 3.3 |
| Di(2-ethylhexyl) phosphoric acid | 0.6 |
| 2-ethylhexanol | 32.8 |
| Tetra(2-ethylhexyl) pyrophosphate | 6.5 |
| 2-ethylhexyl chloride | 1.5 |
| Tri(2-ethylhexyl) phosphate | 49.6 |
| Unknown | 5.6 |

Example II

At a pressure of 400 mm. Hg and a temperature of 20° C., 1,042 grams (8 moles) of 2-ethylhexanol were added, over a 3-hour period, to 613.5 grams (4 moles) of phosphorus oxychloride containing 4.2 grams (0.031 mole) of anhydrous aluminum chloride. The reaction was carried out in a 5-liter glass jacketed kettle equipped with a thermometer well, stirrer, dropping funnel, reflux condenser and a suitable vacuum system which was protected by a cold trap. After the first addition had been completed, the pressure was reduced to 30 mm. Hg, the temperature raised to 35° C. and 1,406 grams (10.8 moles) of 2-ethylhexanol added over a period of 45 minutes.

The reaction temperature was slowly raised to maintain the reaction rate until no further reduction in acidity was obtained. This required 11 hours and a temperature of 108° C. After cooling to room temperature, 2,260 grams of crude product were obtained which had the following properties.

| | |
|---|---|
| Specific gravity, 31°/20° C. | 0.8833 |
| Color, Pt-Co (APHA) | 20 |
| Refractive index, $N_D^{20}$ | 1.4988 |
| Acidity, meq. per gram | 0.087 |

The composition of this crude product was found by analysis to be:

| | Percent by wt. |
|---|---|
| Hydrogen chloride | 0.02 |
| Di(2-ethylhexyl) chlorophosphate | 0.3 |
| Di(2-ethylhexyl) phosphoric acid | 0.8 |
| 2-ethylhexanol | 34.7 |
| Tetra(2-ethylhexyl) pyrophosphate | 4.4 |
| 2-ethylhexyl chloride | 1.4 |
| Tri(2-ethylhexyl) phosphate | 58.0 |
| Unknown | 0.4 |

Example III

At a pressure of 400 mm. Hg and a temperature of 25° C., 1,042 grams (8 moles) of 2-ethylhexanol were added, over a 3-hour period, to 613.5 grams (4 moles) of phosphorus oxychloride containing 2.99 grams (0.031 mole) of anhydrous magnesium chloride. The reaction was carried out in a 5-liter glass jacketed kettle equipped with a thermometer well, stirrer, dropping funnel, reflux condenser and a suitable vacuum system which was protected by a cold trap. After the first addition had been completed, the pressure was reduced to 30 mm. Hg, the temperature raised to 35° C., and 1,406 grams (10.8 moles) of 2-ethylhexanol added over a period of 40 minutes.

The reaction temperature was slowly raised to maintain the reaction rate until no further reduction in acidity was obtained. This required 11 hours and a temperature of 100° C. After cooling to room temperature, 2,309 grams of crude product were obtained which had the following properties.

| | |
|---|---|
| Specific gravity, 20°/20° C. | 0.892 |
| Color, Pt-Co (APHA) | 65 |
| Acidity, meq. per gram | 0.178 |

The composition of this crude product was found by analysis to be:

| | Percent by wt. |
|---|---|
| Hydrogen chloride | Nil |
| Di(2-ethylhexyl) chlorophosphate | 0.1 |
| Di(2-ethylhexyl) phosphoric acid | 5.5 |
| 2-ethylhexanol | 31.5 |
| Tetra(2-ethylhexyl) pyrophosphate | Nil |
| 2-ethylhexyl chloride | 1.8 |
| Tri(2-ethylhexyl) phosphate | 58.0 |
| Unknown | 3.1 |

Example IV

At a pressure of 400 mm. Hg and at a temperature of 20° C., 1,042 grams (8 moles) of 2-ethylhexanol were added, over a 3-hour period, to 613.5 grams (4 moles) of phosphorus oxychloride containing 4.28 grams (0.0314 mole) of anhydrous zinc chloride. The reaction was carried out in a 5-liter glass jacketed kettle equipped wtih a thermometer well, stirrer, dropping funnel, reflux condenser and a suitable vacuum system which was protected by a cold trap. After the first addition had been completed, the pressure was reduced to 30 mm. Hg, the temperature raised to 35° C. and 1,406 grams (10.8 moles) of 2-ethylhexanol added over a period of 60 minutes.

The reaction temperature was slowly raised to maintain the reaction rate until no further reduction in acidity was obtained. This required 13.25 hours and a temperature of 100° C. After cooling to room temperature, 2,290 grams of crude product were obtained which had the following properties.

| | |
|---|---|
| Specific gravity, 20°/20° C. | 0.893 |
| Color, Pt-Co (APHA) | 30 |
| Acidity, meq. per gram | 0.17 |

The composition of the crude product was found by analysis to be:

| | Percent by wt. |
|---|---|
| Hydrogen chloride | 0.07 |
| Di(2-ethylhexyl) chlorophosphate | 1.4 |
| Di(2-ethylhexyl) phosphoric acid | 3.1 |
| 2-ethylhexanol | 31.5 |
| Tetra(2-ethylhexyl) pyrophosphate | 6.1 |
| 2-ethylhexyl chloride | 0.6 |
| Tri(2-ethylhexyl) phosphate | 50.5 |
| Unknown | 6.73 |

Example V

At a pressure of 400 mm. Hg and at a temperature of 20° C., 1,042 grams (8 moles) of 2-ethylhexanol were added, over a 3-hour period, to 613.5 grams (4 moles) of phosphorus oxychloride containing 5.95 grams (0.031 mole) of titanium tetrachloride. The reaction was carried out in a 5-liter glass jacketed kettle equipped with a thermometer well, stirrer, dropping funnel, reflux condenser and a suitable vacuum system which was protected by a cold trap. After the first addition had been completed, the pressure was reduced to 30 mm. Hg, the temperature raised to 35° C. and 1,406 grams (10.8 moles) of 2-ethylhexanol added over a period of 40 minutes.

The reaction temperature was slowly raised to maintain the reaction rate until no further reduction in acidity was obtained. This required 10 hours and a temperature of 99° C. After cooling to room temperature, 2,342 grams of crude product were obtained which had the following properties.

Specific gravity, 20°/20° C_____ 0.891
Color, Pt-Co (APHA)_____ 10
Acidity, meq. per gram_____ 0.137

The composition of the crude product was found by analysis to be:

|  | Percent by wt. |
|---|---|
| Hydrogen chloride | Nil |
| Di(2-ethylhexyl) chlorophosphate | 0.3 |
| Di(2-ethylhexyl) phosphoric acid | 3.4 |
| 2-ethylhexanol | 33.0 |
| Tetra(2-ethylhexyl) pyrophosphate | 0.9 |
| 2-ethylhexyl chloride | 1.3 |
| Tri(2-ethylhexyl) phosphate | 61.1 |

Example VI

At room temperature and in a suitable vessel, 2,038 grams (15.5 moles) of a mixture of alkyl-substituted phenols (equivalent weight 131.4) and 767 grams (5 moles) of phosphorus oxychloride were thoroughly mixed. About 300 ml. of this mixture were charged to a 5-liter glass jacketed kettle equipped with a thermometer well, stirrer, dropping funnel, reflux condenser and a hydrogen chloride trap which was protected by a cold trap. This material was heated to a temperature between 96 and 104° C. and the remaining mixture added over a 2-hour period. The hydrogen chloride trap was replaced by a suitable vacuum system. The temperature was slowly raised to 158° C. and the pressure reduced to 90 mm. Hg. These conditions were maintained until no further drop in acidity was observed. The total reaction time was 14.5 hours. After cooling to room temperature, 2,570 grams of crude product were obtained which had the following properties.

Specific gravity, 20°/15.6° C_____ 1.126
Refractice index, $N_D^{20}$_____ 1.532
Color, Gardner units_____ 7

Analysis of this product showed it to contain diaryl chlorophosphates equivalent to a yield of 94.2 percent and aryl dichlorophosphates equivalent to a yield of 5.8 percent, based on phosphorus oxychloride.

Example VII

At room temperature and in a suitable vessel, 2,038 grams (15.5 moles) of a mixture of alkyl-substituted phenols (equivalent weight 131.4), 767 grams (5 moles) of phosphorus oxychloride and 4.0 grams (0.029 mole) of zinc chloride were thoroughly mixed. About 300 ml. of this mixture were charged to a 5-liter glass jacketed kettle as described in Example VI. The material in the kettle was heated to 100–102° C. at atmospheric pressure and the remainder of the mixture added over a 2-hour period. The hydrogen chloride trap was replaced by the vacuum system and the temperature raised to 157° C. while the pressure was dropped to 50 mm. Hg. This temperature and pressure were maintained for a total of 15 hours. After cooling to room temperature, 2,438 grams of crude product were obtained which had the following properties.

Specific gravity, 20°/15.6° C_____ 1.123
Refractive index, $N_D^{20}$_____ 1.539
Color, Gardner units_____ 6
Acidity, meq. per gram_____ 3.34

Analysis of this product showed it to contain triaryl phosphates equivalent to a yield of 17.2 percent and diaryl chlorophosphates equivalent to a yield of 79.9 percent, both based on phosphorus oxychloride.

Example VIII

At room temperature and in a suitable vessel, 2,038 grams (15.5 moles) of a mixture of alkyl-substituted phenols (equivalent weight 131.4), 767 grams (5 moles) of phosphorus oxychloride and 4.8 grams (0.0296 mole) of ferric chloride were thoroughly mixed. About 300 ml. of this mixture were charged to a 5-liter glass jacketed kettle as described in Example VI. The material in the kettle was heated to a temperature of 96–102° C. at atmospheric pressure and the remainder of the mixture added over a 2-hour period. The hydrogen chloride trap was replaced by the vacuum system and the temperature raised to 157° C. while the pressure was dropped to 50 mm. Hg. This temperature and pressure were maintained for a total of 14 hours. After cooling to room temperature, 2,359 grams of crude product were obtained which had the following properties.

Specific gravity, 20°/15.6° C_____ 1.121
Refractive index, $N_D^{20}$_____ 1.542
Color, Gardner units_____ 12
Acidity, meq. per gram_____ 1.98

Analysis of this product showed it to contain triaryl phosphates equivalent to a yield of 49.5 percent and diaryl chlorophosphates equivalent to a yield of 43.1 percent, both based on phosphorus oxychloride.

Example IX

At room temperature and in a suitable vessel, 2,038 grams (15.5 moles) of a mixture of alkyl-substituted phenols (equivalent weight 131.4), 767 grams (5 moles) of phosphorus oxychloride and 2.8 grams (0.0294 mole) of magnesium chloride were thoroughly mixed. About 300 ml. of this mixture were charged to a 5-liter glass jacketed kettle as described in Example VI. The material in the kettle was heated to a temperature of 99–102° C. at atmospheric pressure and the remainder of the mixture added over a 2-hour period. The hydrogen chloride trap was replaced by the vacuum system and the temperature raised to 157° C. and the pressure dropped to 50 mm. Hg. This temperature and pressure were maintained for 10.5 hours. After cooling to room temperature, 2,271 grams of crude product were obtained which had the following analysis.

Specific gravity, 20°/15.6° C_____ 1.120
Refractive index, $N_D^{20}$_____ 1.1548
Color, Gardner units_____ 2
Acidity, meq. per gram_____ 0.048

Analysis of this product showed it to contain triaryl phosphates equivalent to a yield of 98.3 percent and diaryl chlorophosphates equivalent to a yield of 0.6 percent, both based on phosphorus oxychloride.

Example X

At room temperature and in a suitable vessel, 2,038 grams (15.5 moles) of a mixture of alkyl-substituted phenols (equivalent weight 131.4), 767 grams (5 moles) of phosphorus oxychloride and 3.9 grams (0.0293 mole) of aluminum chloride were thoroughly mixed. About 300 ml. of this mixture were charged to a 5-liter glass jacketed kettle as described in Example VI. The material in the kettle was heated to 100–104° C. at atmospheric pressure and the remainder of the mixture added over a 2-hour period. The hydrogen chloride trap was replaced by the vacuum system and the temperature raised to 158° C. and the pressure dropped to 50 mm. Hg. This temperature and pressure were maintained for a period of 12.5 hours. During this reaction period a sticky, gelatinous precipitate appeared on the surface of the kettle. After cooling to room temperature, 2,275 grams of crude product were obtained which had the following analysis.

| | |
|---|---|
| Specific gravity, 20°/15.6° C | 1.117 |
| Refractive index, $N_D^{20}$ | 1.538 |
| Color, Gardner units | 12 |
| Acidity, meq. per gram | 0.099 |

Analysis of this product showed it to contain triaryl phosphates equivalent to a yield of 98.1 percent and diaryl chlorophosphates equivalent to a yield of 0.4 percent, both based on phosphorus oxychloride.

*Example XI*

At room temperature and in a suitable vessel, 2,038 grams (15.5 moles) of a mixture of alkyl-substituted phenols (equivalent weight 131.4), 767 grams (5 moles) of phosphorus oxychloride and 5.6 grams (0.0294 mole) of titanium tetrachloride were thoroughly mixed. About 300 ml. of this mixture were charged to a 5-liter glass jacketed kettle as described in Example VI. The material in the kettle was heated to 100–102° C. at atmospheric pressure and the remainder of the mixture added over a 2-hour period. The hydrogen chloride trap was replaced by the vacuum system and the temperature raised to 157° C. and the pressure reduced to 50 mm. Hg. This temperature and pressure were maintained for 11 hours. After cooling to room temperature, 2,294 grams of crude product were obtained which had the following properties.

| | |
|---|---|
| Specific gravity, 20°/15.6° C | 1.118 |
| Refractive index, $N_D^{20}$ | 1.1545 |
| Color, Gardner units | 18 |
| Acidity, meq. per gram | 0.114 |

Analysis of this crude product showed it to contain triaryl phosphates equivalent to a yield of 96.6 percent and diaryl chlorophosphates equivalent to a yield of 1.5 percent, both based on phosphorus oxychloride.

In Examples VI through XI the mixture of alkyl-substituted phenols employed was obtained from the phenolic fraction of coal hydrogenation products. This phenolic mixture is an illustration of the mixtures of alkyl-substituted phenols which may be reacted in the process of this invention. This invention can, of course, be applied to individual alkyl-substituted phenols as well as to mixtures thereof.

In Examples VI through XI an "equivalent weight" of the mixture of alkyl-substituted phenols in the reaction mixture was determined by dividing the weight in grams of the mixture of alkyl-substituted phenols by the number of equivalents of alkyl-substituted phenols present in the mixture of alkyl-substituted phenols. The number of equivalents of alkyl-substituted phenols could be determined by a known procedure that comprises mixing a sample of the mixture of alkyl-substituted phenols with a known number of equivalents of acetic anhydride and then determining the number of equivalents of the anhydride that reacted with the phenols.

The "aryl" phosphates produced in Examples VI through XI were mixed phosphate esters derived from the various alkyl-substituted phenols that were reacted.

What is claimed is:

1. A process for producing triorgano-phosphates that are represented by the formula, $(R''O)_3PO$ wherein $R''O$ is a group selected from the group consisting of phenoxy groups containing from 0 to 3 alkyl substituents, said alkyl substituents containing from 1 to 4 carbon atoms, and $R'CH_2O$ groups wherein $R'$ is an alkyl group containing from 3 to 12 carbon atoms, which comprises forming a mixture of an organic hydroxyl compound selected from the group consisting of alcohols that are represented by the formula, $R'CH_2OH$, and phenols containing from 0 to 3 alkyl substituents, said alkyl substituents containing from 1 to 4 carbon atoms, phosphorus oxychloride and a catalytic amount of titanium tetrachloride, said catalytic amount being at least 0.01% of the combined weights of said organic hydroxyl compound, phosphorus oxychloride and titanium tetrachloride and heating the mixture to cause the organic hydroxyl compound and the phosphorus oxychloride to react to produce a triorgano-phosphate that is represented by the formula $(R''O)_3PO$.

2. A process for producing triorgano-phosphates that are represented by the formula, $(R''O)_3PO$ wherein $R''O$ is a group selected from the group consisting of phenoxy groups containing from 0 to 3 alkyl substituents, said alkyl substituents containing from 1 to 4 carbon atoms, and $R'CH_2O$ groups wherein $R'$ is an alkyl group containing from 3 to 12 carbon atoms, which comprises forming a mixture of an organic hydroxyl compound selected from the group consisting of alcohols that are represented by the formula, $R'CH_2OH$, and phenols containing from 0 to 3 alkyl substituents, said alkyl substituents containing from 1 to 4 carbon atoms, phosphorus oxychloride and from 0.01 part by weight to 5 parts by weight of titanium tetrachloride per 100 parts by weight of the mixture and heating the mixture to cause the organic hydroxyl compound and the phosphorus oxychloride to react to produce a triorgano-phosphate that is represented by the formula $(R''O)_3PO$.

3. A process for producing triorgano-phosphates that are represented by the formula, $(R''O)_3PO$ wherein $R''O$ is a group selected from the group consisting of phenoxy groups containing from 0 to 3 alkyl substituents, said alkyl substituents containing from 1 to 4 carbon atoms, and $R'CH_2O$ groups wherein $R'$ is an alkyl group containing from 3 to 12 carbon atoms, which comprises forming a mixture of an organic hydroxyl compound selected from the group consisting of alcohols that are represented by the formula, $R'CH_2OH$, and phenols containing from 0 to 3 alkyl substituents, said alkyl substituents containing from 1 to 4 carbon atoms, phosphorus oxychloride and from 0.1 part by weight to 1.0 part by weight of titanium tetrachloride per 100 parts by weight of the mixture and heating the mixture to cause the organic hydroxyl compound and the phosphorus oxychloride to react to produce a triorgano-phosphate that is represented by the formula $(R''O)_3PO$.

4. A process for producing triorgano-phosphates that are represented by the formula, $(R''O)_3PO$ wherein $R''O$ is a phenoxy group containing from 0 to 3 alkyl substituents, said alkyl substituents containing from 1 to 4 carbon atoms, which comprises forming a mixture of a phenol containing from 0 to 3 alkyl substituents, said alkyl substituents containing from 1 to 4 carbon atoms, phosphorus oxychloride and a catalytic amount of titanium tetrachloride, said catalytic amount being at least 0.01% of the combined weights of said phenol, phosphorus oxychloride and titanium tetrachloride and heating the mixture to cause the phenol and the phosphorus oxychloride to react to produce a triorgano-phosphate that is represented by the formula $(R''O)_3PO$.

5. A process for producing triorgano-phosphates that are represented by the formula, $(R'CH_2O)_3P$ wherein $R'$ is an alkyl group containing from 3 to 12 carbon atoms, which comprises forming a mixture of an alcohol that is represented by the formula $R'CH_2OH$, phosphorus oxychloride and a catalytic amount of titanium tetrachloride, said catalytic amount being at least 0.01% of the total weight of the said alcohol, phosphorus oxychloride and titanium tetrachloride and heating the mixture to cause the alcohol and the phosphorus oxychloride to react to produce a triorgano-phosphate that is represented by the formula $(R'CH_2O)_3P$.

6. A process for producing tri(2-ethylhexyl) phosphate which comprises forming a mixture of 2-ethylhexanol, phosphorus oxychloride and a catalytic amount of titanium tetrachloride, said catalytic amount being from 0.01% to 5% of the combined weight of said 2-ethylhexanol, phosphorus oxychloride and titanium tetrachloride and heating the mixture at a temperature of from 60° C. to 150° C. to cause the 2-ethylhexanol and the phosphorus oxychloride to react to produce tri(2-ethylhexyl) phosphate.

References Cited in the file of this patent

UNITED STATES PATENTS

| | | |
|---|---|---|
| 2,005,619 | Graves | June 18, 1935 |
| 2,410,118 | Woodstock et al. | Oct. 29, 1946 |
| 2,610,978 | Lanham | Sept. 16, 1952 |